(12) United States Patent
Boeddeker et al.

(10) Patent No.: US 10,235,167 B2
(45) Date of Patent: Mar. 19, 2019

(54) MICROPROCESSOR WITH SUPPLEMENTARY COMMANDS FOR BINARY SEARCH AND ASSOCIATED SEARCH METHOD

(71) Applicant: DENSO CORPORATION, Kariya, Aichi-pref. (JP)

(72) Inventors: Bert Boeddeker, Eching (DE); Dominik Langen, Eching (DE); Sebastian Kehr, Eching (DE)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 15/493,600

(22) Filed: Apr. 21, 2017

(65) Prior Publication Data

US 2017/0315808 A1 Nov. 2, 2017

(30) Foreign Application Priority Data

May 2, 2016 (DE) .................. 10 2016 108 081

(51) Int. Cl.
*G06F 9/30* (2018.01)
*G06F 7/02* (2006.01)
*G06F 8/41* (2018.01)

(52) U.S. Cl.
CPC ............ *G06F 9/30021* (2013.01); *G06F 7/02* (2013.01); *G06F 8/41* (2013.01); *G06F 9/3001* (2013.01);
(Continued)

(58) Field of Classification Search
None
See application file for complete search history.

(56) References Cited

U.S. PATENT DOCUMENTS 5,388,236 A * 2/1995 Murakami ............ H04N 5/145
375/E7.1
5,544,357 A 8/1996 Huei
(Continued)

FOREIGN PATENT DOCUMENTS

EP  2238689 B1  6/2012

OTHER PUBLICATIONS

Khuong, P: Binary Search—doing it less wrong, 2014 URL: http: repnop.org/pd/slides/bsearch.pdf.
(Continued)

*Primary Examiner* — Eric Coleman
(74) *Attorney, Agent, or Firm* — Posz Law Group, PLC (57) ABSTRACT

A microprocessor for a vehicle control device includes: an instruction set; a register section with a status register, a first flag being provided in the status register for storing a logical result of a comparison operation; and an arithmetic logical unit. The status register comprises a second flag for storing the logical result of a second comparison operation. The instruction set comprises a first additional instruction, which performs a comparison among two handed-over operands, a result of the comparison being stored in the second flag. The instruction set comprises a second additional instruction, which selects and performs one of at least three pre-defined operations on a basis of a logic connection of values in the first flag and the second flag, for updating an upper boundary and/or a lower boundary of a search field in a binary search for a next iteration.

10 Claims, 4 Drawing Sheets

(52) U.S. Cl.
CPC ...... *G06F 9/30094* (2013.01); *G06F 9/30101* (2013.01); *G06F 9/30174* (2013.01)

(56) References Cited

U.S. PATENT DOCUMENTS

| | | | |
|---|---|---|---|
| 7,035,995 B2 | 4/2006 | Henry et al. | |
| 7,167,973 B2* | 1/2007 | Mizrachi | G06F 9/30061 |
| | | | 712/234 |
| 8,291,150 B2* | 10/2012 | El | H03M 7/40 |
| | | | 341/50 |
| 8,868,520 B1* | 10/2014 | Raghuwanshi | G06F 17/30156 |
| | | | 707/692 |
| 2003/0149751 A1* | 8/2003 | Bellinger | G06F 9/4411 |
| | | | 709/220 |
| 2004/0078556 A1* | 4/2004 | Spracklen | G06F 9/30018 |
| | | | 712/223 |
| 2004/0117596 A1 | 6/2004 | Henry et al. | |
| 2007/0169011 A1* | 7/2007 | Ramani | G06F 9/44521 |
| | | | 717/136 |
| 2007/0255933 A1* | 11/2007 | Moyer | G06F 9/30036 |
| | | | 712/234 |
| 2012/0166440 A1* | 6/2012 | Shmueli | G06F 17/30625 |
| | | | 707/737 |
| 2015/0269119 A1* | 9/2015 | Sreedhar | G06F 15/8015 |
| | | | 712/22 |

OTHER PUBLICATIONS

Perkins, H: Computer Science (CSE 410) -6- x86 Assembly Programming, 2013, Slides: 1-4, 38-55 https://courses.cs.washington.edu/courses/cse410/13au/lectures/06-machineprog.pdf.
Talk: Binary search algorithm/Archive 1. In: Wikipedia, the free encyclopedia. As of Apr. 21, 2013, pp. 1, 5-8, 37-41, URL: https://en.wikipedia.org/wiki/Talk%3ABinary_search_algorithm/Archive_1.

* cited by examiner

MICROPROCESSOR WITH SUPPLEMENTARY COMMANDS FOR BINARY SEARCH AND ASSOCIATED SEARCH METHOD

CROSS REFERENCE TO RELATED APPLICATION

This application is based on German Patent Application No. 10 2016 108 081.0 filed on May 2, 2016, the disclosure of which is incorporated herein by reference.

TECHNICAL FIELD

The disclosure relates to a microprocessor with a von Neumann architecture. It also relates to a search method for executing a binary search.

BACKGROUND

The microprocessors known so far are not optimally designed for the execution of a binary search. In particular, sequential comparisons with subsequent conditional jumps are executed in the previously known methods in a program section that is to be repeated, in order to divide a search field into two sub-fields, and to continue the search in that sub-field in which the element that is sought must be located. These conditional jumps can significantly lengthen the execution on a microprocessor, in particular since the results of the comparison are very unpredictable.

SUMMARY

It is an object of the present disclosure to provide a microprocessor with which a binary search can be more efficiently executed, as well as an associated search method. The disclosure furthermore relates to a vehicle control device.

According to one aspect of the present disclosure, a microprocessor for a vehicle control device includes: an instruction set; a register section with a status register, a first flag being provided in the status register for storing a logical result of a comparison operation; and an arithmetic logical unit. The status register comprises a second flag for storing the logical result of a second comparison operation. The instruction set comprises a first additional instruction, which perform a comparison among two handed-over operands, in particular a greater-comparison or a smaller-comparison, wherein a result of the comparison is stored in the second flag. The instruction set comprises a second additional instruction, which selects and performs one of at least three pre-defined operations on a basis of a logic connection of values in the first flag and the second flag, for updating an upper boundary and/or a lower boundary of a search field in a binary search for a next iteration.

According to another aspect of the present disclosure, a searching method for performing a binary search with direct utilization of an instruction set of a microprocessor, wherein in the method a position of a search value is determined within an indexed data structure with sorted elements, and wherein a search field is defined within the data structure by a lower boundary with a first element index and by an upper boundary with a second element index, is provided. In the searching method, following steps are performed iteratively: placing a search position to an averaged element index within the search field; performing at least two comparisons among the element in the data structure at the search position and the search value, depending on results of the at least two comparisons, varying the lower boundary and/or the upper boundary of the search field so that a new search field for a next iteration comprises only a partial field of a previous search field. The method terminates, when the search value is found within the data structure or when the search field comprises only a single or no remaining element. The microprocessor is designed according to claim 1. The first additional instruction of the microprocessor is used for performing at least one of the two comparisons among the element in the data structure at the search position and the search value. The second additional instruction is used for varying the lower boundary and/or the upper boundary of the search field.

According to another aspect of the present disclosure, a program product comprising instructions for implementing the search method, in particular wherein the program product is present in a form of assembler code or machine code is provided.

According to another aspect of the present disclosure, a compiler for translating a source code in a problem oriented programming language into a machine code or assembler code, which can be executed by the microprocessor is provided. The compiler includes: at least one intrinsic function for encapsulating the first additional instruction and/or the second additional instruction of the microprocessor in a function call, which is available to the source code in the problem oriented programming language; and/or translation statements, which utilize the first additional instruction and/or the second additional instruction of the microprocessor in generation of the assembler code or machine code, in particular for translating a section of a problem oriented programming language source code, which provides execution of a binary search.

According to another aspect of the present disclosure, a vehicle control device comprising the microprocessor is provided.

According to this configuration, the microprocessor set of commands is expanded in relation to conventional command sets by at least two supplementary commands, by means of which a binary search can be executed significantly faster while avoiding the conditional jumps. It may be possible to execute a binary search more efficiently, as well as an associated search method.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
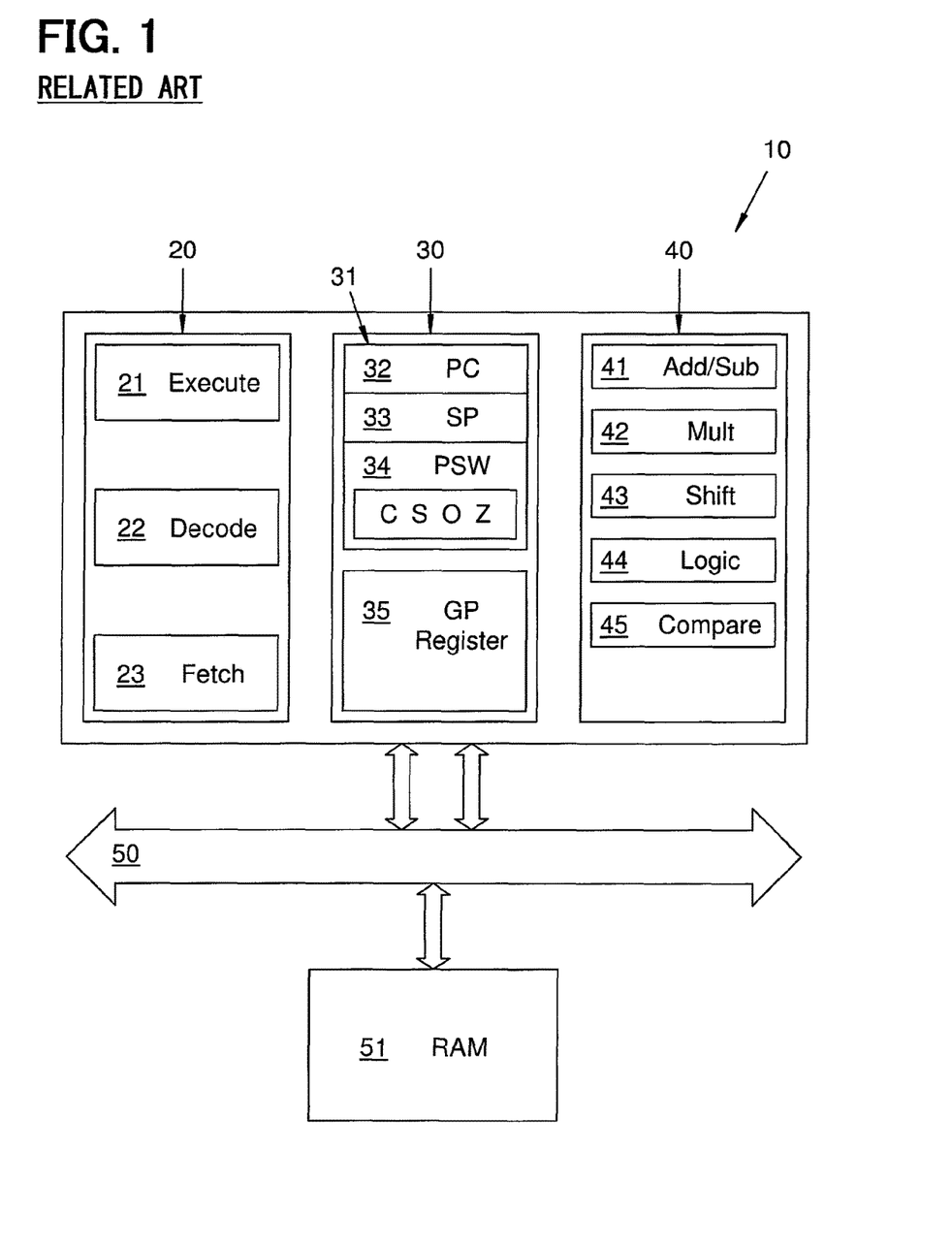
FIG. 1 is a diagram of a microprocessor having a processor architecture according to a related art.

The microprocessor 10 according to a related art, depicted in FIG. 1, has a command set, diverse registers in a register section 30, and an arithmetical logical unit 40.

The microprocessor comprises a pipeline with at least one execution step 21, a decoding step 22, and a fetch step 23. Commands and values are fetched (loaded), decoded, and executed by the pipeline. It forms a type of assembly line, in which the processing of the machine commands is broken down into sub-tasks, which can be executed in parallel for numerous commands. Instead of an entire command, only one sub-task is processed in each case during a clock cycle of the microprocessor, but the various sub-tasks of numerous commands are processed simultaneously thereby, in particular with a parallel use of the various sub-units 41-45 of the arithmetical logical unit 40 (ALU).

Since the sub-tasks are simpler (and thus quicker) than the processing of the entire command at once, the efficiency of the processing by the microprocessor can be increased through pipelining. On the whole, a single command requires numerous cycles for its execution, but since a command can be "completed" in each cycle through the basically parallel processing of numerous commands, the overall throughput is increased by the pipelining.

The registers 30 of the microprocessor 10 comprise special registers 31 and general purpose registers 35 (GP register). The special registers 31 contain a command register 32 (program counter, PC), a stack pointer 33 (SP), and a status register (process status word PSW). The status register 34 comprises, by way of example, a carry flag C, a sign flag or negative flag S, an overflow flag O, and a zero flag Z. The zero flag Z is referred to as the "first flag" Z in the microprocessor described below according to the present disclosure. The status register 34 may also be referred to as a processor status word (PSW).

Various basic units are contained in the arithmetical logical unit 40 (ALU). These include, by way of example, an addition/subtraction unit 41, a multiplication unit 42, a shift unit 43, diverse logical units 44, and a comparison unit 45. The command set and the functional units 41-45 are implemented in the hardware. An implementation of commands using microcode is also regarded in this context as hardware implementation. The commands can be combined to form programs, and stored in a memory 51 that can be accessed by the microprocessor 10. The microprocessor 10 can then retrieve (fetch), decode and execute these commands from the memory 51 (also referred to as a data storage such ash RAM/ROM) by calling up the respective addresses. The diverse logical units 44 may also be referred to as a logic unit.

The microprocessor 10 exchanges data with the memory 51, RAM/ROM via a communication infrastructure 50, e.g. via a interconnect bus.

A known method for executing a binary search shall be explained below, with reference to FIGS. 2 and 3A to 3D.

Figure 3A:
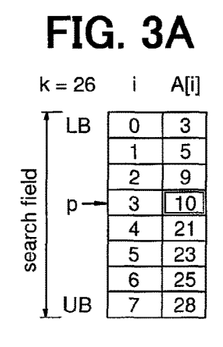
FIG. 3A is status results for explaining a binary search in an indexed data structure with ordered elements.

An indexed data structure A having ordered elements A[i] is depicted in FIG. 3A. That element index Ai in the data structure where a value A is present that is identical to a search value k is to be located through the binary search. The element index i may be an example of a position, and the ordered elements A[i] may be an example of a sorted elements.

Figure 2:
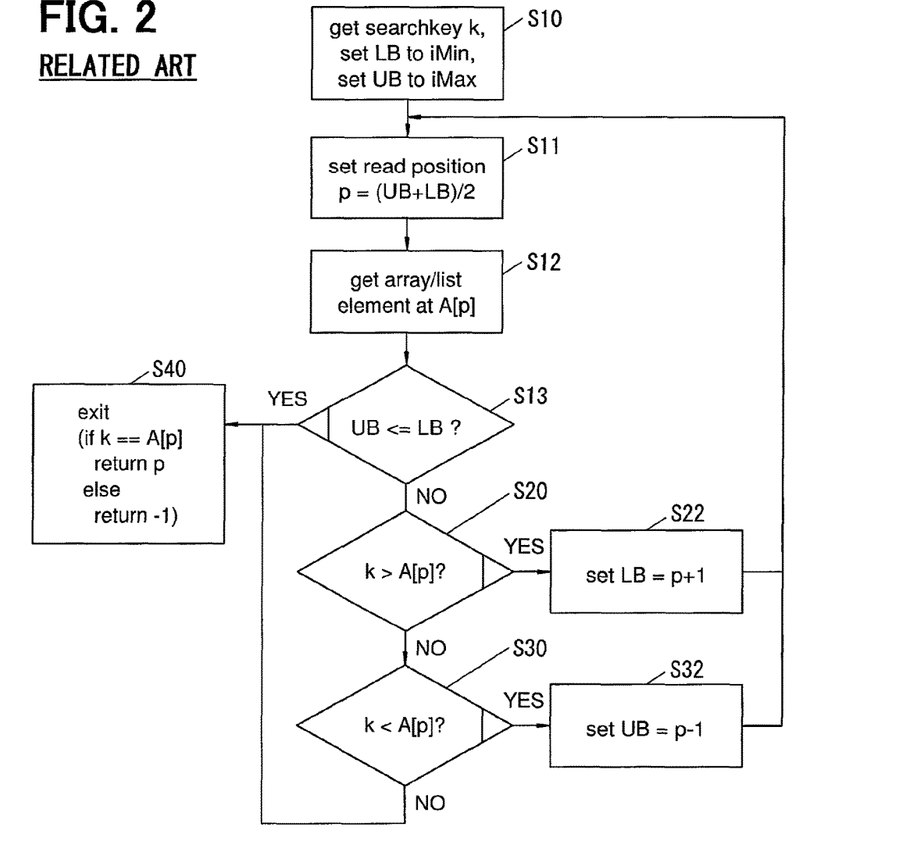
FIG. 2 is a flow chart for the execution of a binary search on a processor according to a related art.

In the first step S10 shown in FIG. 2, the search value k is taken by the method. Furthermore, a lower boundary LB and an upper boundary UB are established, in each case on an element index (iMin, iMax), which are to delimit the start and end of a search field inside the data structure A. The lower boundary LB may also be referred to as a lower bound of search field. The upper boundary UB may also be referred to as an upper bound of search field. The element index iMin may be an example of a first element index, and the element index iMax may be an example of a second element index.

In the subsequent step S11, the search position p is set at an averaged element index in the search field.

In the next subsequent step S12, the value A at the position (i=p) is read out in the data structure A.

In the method according to a related art, three comparisons are then sequentially executed with conditional jump instructions. In the first comparison S13, it is checked whether the search field now contains only one element or no elements. This can be determined through the inequation: upper boundary UB≤ lower boundary LB? The zero flag Z for storing the logical results of a comparison operation is set accordingly. A conditional jump instruction checks the state of this zero flag Z and executes a jump to another code section when the comparison is positive. This further code section is indicated by way of example in step S40. When the search field then contains only one, or no elements, it no longer makes sense to continue searching, and the search process can be stopped. When the value in the data structure at the search position corresponds to the search value k=A[p], the search position p is indicated. Otherwise, an error value is indicated, e.g. negative one (−1).

When the comparison in step S13 is negative, i.e. when the search field comprises more than one element, the comparison according to step S20 is subsequently executed. It is checked there whether the search value k is greater than the value A[p] at the search position p (corresponding to an example of a greater-comparison, k>A[p]). The zero flag Z is reset depending on the comparison result. A conditional jump instruction checks the value of the flag Z and executes a jump to another code section when the comparison result is positive. This other code section is presently illustrated in step S22. The lower boundary LB of the search field is set in this step to an element index that is greater than the current search position by a value of one (LB=p+1), and is thus updated for the next search run. Subsequently, the processing specified above is repeated starting at step S11.

If the comparison result in step S20 is negative, the next comparison is carried out according to step S30. It is checked here whether the search value k is less than the value A at the search position p (corresponding to an example of a smaller-comparison, k<A[p]). Depending on the comparison result, the value of the zero flag Z is reset, and the processing is continued at a next code section S32 by means of another conditional jump instruction when the result of the comparison in step S30 is positive. The upper boundary UB is set to an element index in this further code instruction S32, which is one less than the current search position (UB=p−1), and thus updated for the next search run. Subsequently, the processing is executed again, starting at step S11.

If, however, the comparison in step S30 is negative, thus if the search value k is neither greater than, nor lesser than the value A at the search position p, then the value and the search value must be identical A[p]=k!. Accordingly, the search value k has been located in the data structure A, and the processing can be stopped in accordance with step S40.

A complete search run with numerous repetitions of the process steps described above is illustrated in FIGS. 3A to 3D.

The search value k has a value of 26 in the present example. The indexed data structure A is designed as an array.

In the first run according to FIG. 3A, the lower boundary LB is set at the element index 0. The upper boundary UB is set at the last element index 7. The search position p is set at the middle of the search field, rounded down here to the element index 3. The greater than comparison according to step S20 shows that the search value (k=26) is greater than the value (A[3]=10) at the search position (p=3). Accordingly, in the transition from FIG. 3A to FIG. 3B, the lower boundary LB is set to the element index 4.

Figure 3B:
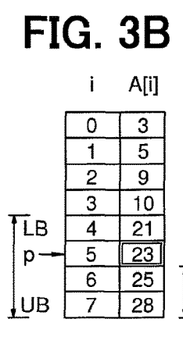
FIG. 3B is status results for explaining a binary search in an indexed data structure with ordered elements.

In the next run, it is determined by the comparison S20 that the search value (k=26) is greater than the value (A[5]=23) at the search position (p=5). Accordingly, the lower boundary LB is changed to the element index 6.

Figure 3C:
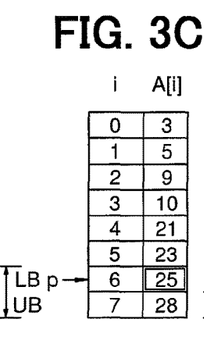
FIG. 3C is status results for explaining a binary search in an indexed data structure with ordered elements.

In the third run, according to FIG. 3C, the search position p is set to the element index 6. The comparison according to step S20 establishes that the search value (k=26) is again greater than the value there (A[6]=25), such that the lower boundary LB is set to the element index 7.

Figure 3D:
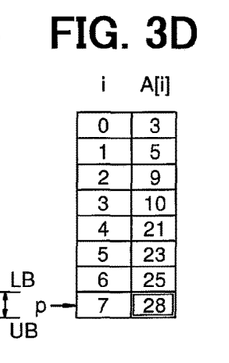
FIG. 3D is status results for explaining a binary search in an indexed data structure with ordered elements.

In the final run according to FIG. 3D, the search field comprises only one more element, such that in the comparison according to step S13, a conditional jump to the code instruction according to step S40 is executed. It is determined there that the search value (k=26) is not identical to the value (A[7]=28) at the search position (p=7). Consequently, the search function results in the error value −1.

The advantage of the pipeline is the increase in the processing speed, which comes into play in particular in the formation of long pipelines. It is the case, however, that many commands are being processed simultaneously. In the event of a pipeline flush, all of the commands in the pipeline are discarded, and the pipeline is subsequently repopulated. This requires a reloading of commands from the memory or the command cache of the CPU, such that high latency periods result in which the processor is inactive.

Precisely such a pipeline flush is necessary in the execution of a binary search with conditional jumps according to steps S10, S20 in FIG. 2 each time the result of the respective comparison is incorrectly predicted. Studies have shown that up to 70% of the predictions for the comparison results in steps S10, S20 are false, such that the processing on the microprocessor according to the related art does is not at optimal efficiency.

A modified system architecture for the microprocessor 10 according to the present disclosure is described below, with reference to FIGS. 4 and 5, and an optimized search method for executing a binary search shall be explained.

Figure 4:
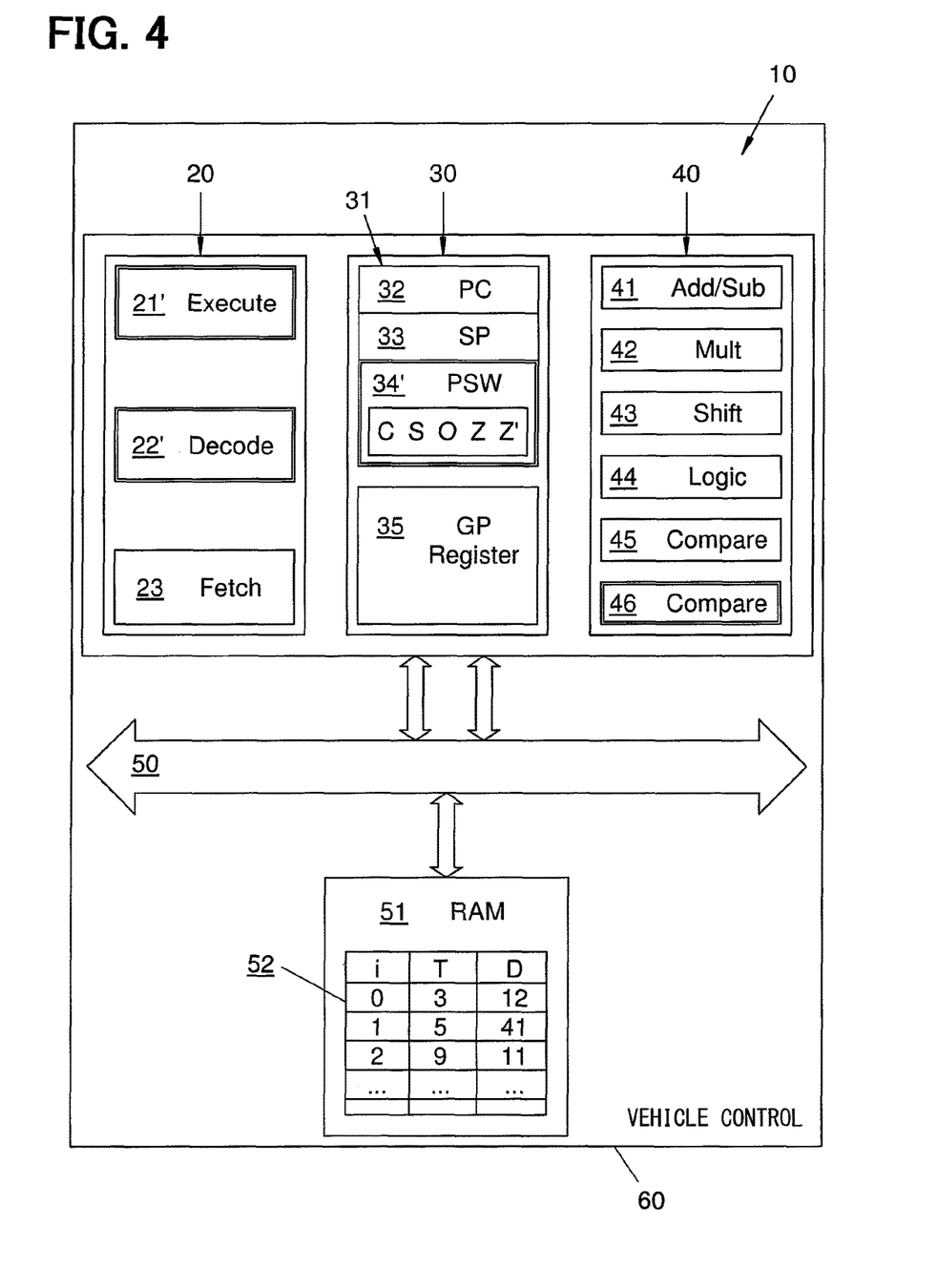
FIG. 4 is a diagram of a microprocessor according to the present disclosure.

The microprocessor 10 according to the present disclosure depicted in FIG. 4 preferably comprises all of the components also contained in the microprocessor 10 according to FIG. 1. The above explanations of FIG. 1 likewise apply to the microprocessor 10 according to FIG. 4. The microprocessor 10 according to the present disclosure preferably has a unit 20 for retrieving and processing instructions. Typically, this unit is designed as a pipeline. By way of example, a three-stage pipeline is described in this disclosure, having an execution stage 21', a decoding stage 22', and a retrieval stage 23. The unit 20 may correspond to a pipeline. The execution stage 21' may be referred to as an extended execution stage. The decoding stage 22' may be referred to as an extended decoding stage.

The microprocessor 10 according to the present disclosure comprises an extended command set. In order to be able to process the supplementary commands S100, S200 explained below, expansions are preferably provided in the execution stage 21' and/or the decoding stage 22' in the pipeline 20'. The supplementary command S100 may be an example of a first additional instruction. The supplementary command S200 may be an example of a second additional instruction.

The status register 34' expanded by a second flag Z' for storing the logical results of a comparison operation, such that the results of two (simultaneously or sequentially executed) comparison operations can be stored independently of one another in the status register. The status register 34' may also be referred to as an extended processor status word. The second flag Z' may also be referred to as an additional zero flag.

According to a preferred design, the arithmetical logical unit 40 comprises a first comparison unit 45 and additionally, a second comparison unit 46, which can preferably be operated simultaneously for executing a first comparison S20' and a second comparison S30' in the search method according to the present disclosure.

The microprocessor 10 can be disposed, particularly preferably, in a vehicle control device 60. The vehicle control device 60 further comprises a data memory 51 (RAM/ROM) in which at least one indexed data structure A having ordered elements is present. The indexed data structure is particularly preferably designed as an indexed circular buffer 52. Tuples comprised of at least one data element D and one ordered value, in particular a time value T, can be stored. The vehicle control device 60 is furthermore preferably designed to execute the search method explained below in reference to FIG. 5, in order to determine the element index i in the circular buffer 52, at which a reference time value k or a time value T following the reference time value k is located, in particular the next smaller or the next greater time value T. The indexed circular buffer 52 may also be referred to a ring buffer. The vehicle control device 60 may also be referred to as a vehicle control device/ electronic control unit. The data element D may also be referred to as an indexable data structure/array.

Figure 5:
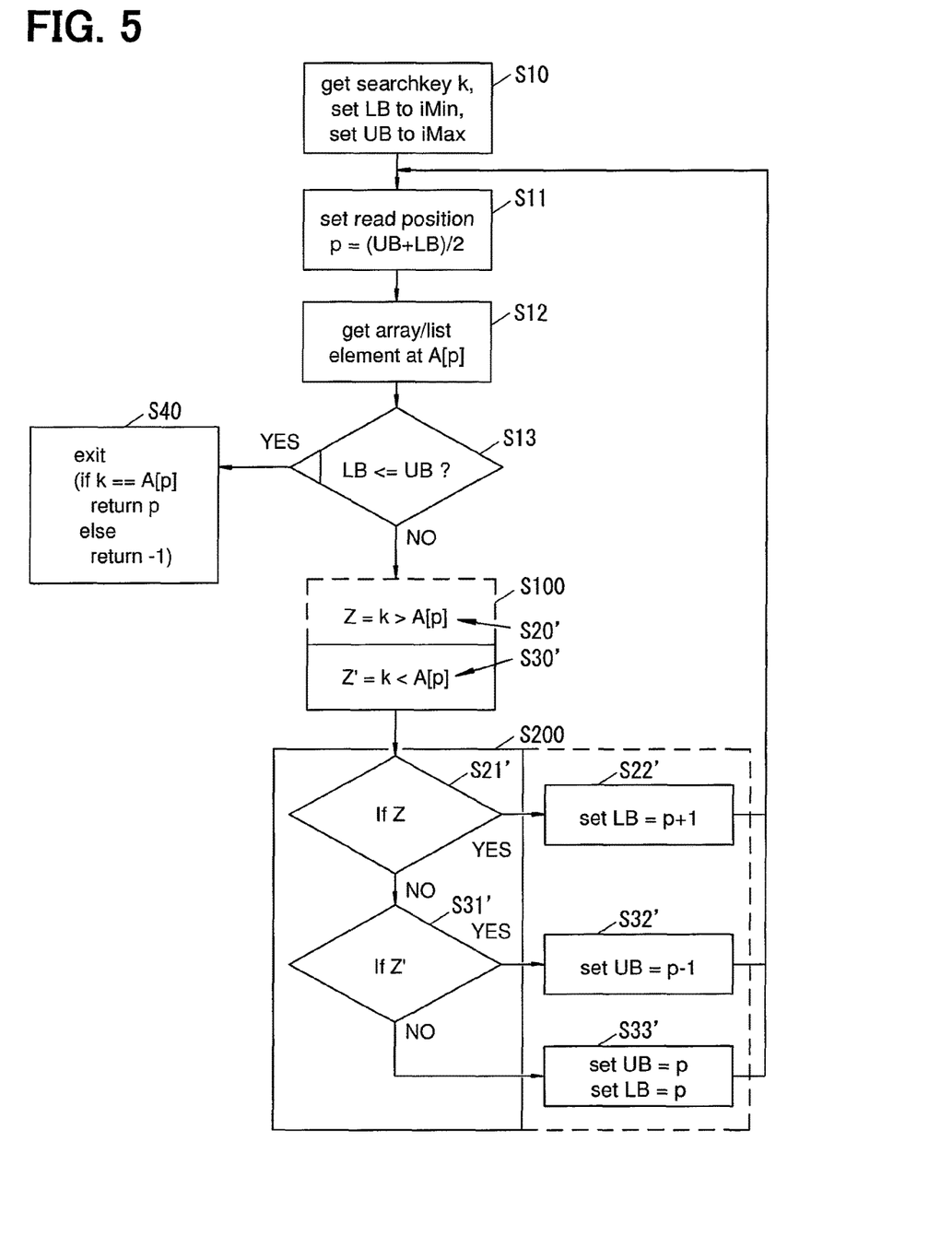
FIG. 5 is a flow chart for explaining a search method according to the present disclosure.

The search method according to FIG. 5 corresponds in steps S10 to S13 to the search method from FIG. 2, such that there shall be no repetition of the explanation of these steps.

Instead of the two separate comparisons S20, S30, the first supplementary command S100 of the microprocessor 10 is used in the search method according to the present disclosure. The two comparisons S20', S30' between the search value k and the value A[p] in the data structure A are carried out sequentially or in parallel in the supplementary command S100 according to the preferred example of FIG. 4, wherein the value of the first flag Z is set as a function of the first comparison S20' and the value of the second flag Z' is set as a function of the result of the second comparison S30'. The supplementary command S100 thus executes both comparisons S20', S30' here, which enables a particularly efficient implementation. Alternatively, the first supplementary command S100 could execute only one of these comparisons S20', S30, and store its result in the second flag Z', while the other comparison is executed using conventional commands, and the result is stored in the first flag Z.

Subsequently, the second supplementary command S200 is used, wherein, depending on the values of the two flags Z, Z', an operation to be carried out for updating the lower boundary LB and/or the upper boundary UB is selected. When the first flag Z contains a value that indicates that the first comparison S20' has generated a positive result, the operation according to step S22' is selected, such that the lower boundary LB is updated. The lower boundary LB is set here to an element index that is one greater than the current search position (LB =p+1). Incidentally, the second supplementary command S200 may receive a first operand (corresponding to search position p), a second operand (corresponding to the lower boundary LB) and a third operand (corresponding to the upper boundary UB), and the at least three operations may comprise statements for updating the upper bound UB and the lower bound LB in a binary search for the next iteration. When the value of the second flag Z' indicates that the second comparison S30' has led to a positive result, a second operation S32' is selected, such that the upper boundary UB is updated. The upper boundary is set to an element index here that is one less than the current search position (UB=p−1). Alternatively, other operations could be provided for updating the upper boundary UB or the lower boundary LB.

When both flags Z, Z' indicate that neither of the two comparisons S20', S30' has delivered a positive result, a third operation S33' is selected. In other words, the third operation S33' is selected when the two comparisons S20', S30' have indicated that the search value k is the same as the data value A[p] at the search position p. In such a case, according to the example in FIG. 5, both the lower boundary LB as well as the upper boundary UB are set to the element index of the current search position p (LB=p, UB=p). In this case, two write ports are needed, since in the third operation S32', both the upper boundary UB as well as the lower boundary LB are used as the target operand. A variation is described below in which just one target operand is necessary in the third operation S32', i.e. an updating of the upper boundary UB or the lower boundary LB in order to trigger the stop conditions.

The two supplementary commands S100, S200 are executed in hardware. The second supplementary command S200 comprises at least the checking of the two flags Z, Z' and the selection of the operation that is to be carried out next S22', S32', S33'. Alternatively, and preferably, the aforementioned operations S22', S32', S33' can also be executed in hardware. In particular, they can be components of the supplementary command S200.

The first supplementary command S100 takes two operands (k, A[p]), and preferably makes two comparisons thereof, in particular a greater than comparison S20' and a lesser than comparison S30'. It is particularly preferred that both comparisons S20', S30' are executed by the supplementary command S100 accessing the two comparison units 45, 46 simultaneously, i.e. in parallel. As a result, the processing time for each repetition in the search method is shortened.

The search method according to the present disclosure functions without a conditional jump command due to the use of the two supplementary commands S100, S200 for the changing of the lower boundary LB and the upper boundary UB. As a result, no pipeline flush is required, and the search method can be executed with an optimal use of the computing power of the microprocessor 10.

Through the elimination of the two conditional jump commands in the search method according to FIG. 2, an acceleration in the search method according to FIG. 5 of up to 30% can be expected (depending on the respective processor architecture).

The search method according to the present disclosure is preferably designed as a program product (also referred to as a software product), and stored, for example, on a data carrier. Directions for converting the search method, and in particular to retrieve the two supplementary commands S100, S200 are contained in the program product. The program product can be written in assembler code or machine code, wherein a direct accessing of the supplementary commands is possible. Alternatively, the program product can be written in a high level language (problem oriented program language), wherein a compiler adapted thereto ensures that the supplementary commands S100, S200 for executing a binary search are retrieved.

Such a compiler, according to the present disclosure, is designed for translating a source code in a problem oriented program language (high level language) into a machine code or assembler code, wherein the machine code or assembler code can be executed by a microprocessor 10 in accordance with the present disclosure. The compiler comprises:

at least one intrinsic function, in order to encapsulate the first and/or the second supplementary command S100, S200 of the microprocessor in a function retrieval that is available in the source code of the high level language; AND/OR translations instructions that use the first and/or the second supplementary command S100, S200 of the microprocessor in the generation of the assembler code or machine code, in particular for translating a section into the high level language source code (corresponding to a problem oriented programming language source code), which is provided for executing a binary search.

There can be one or more of the circular buffers 52 depicted in FIG. 4. It can particularly preferably be used to implement an information flow between periodically executed tasks (process parts) in a parallelized control software. A task that produces information can write one data element D in the circular buffer 52 in each case, wherein additionally, a time value T (or a sortable representative value) for the point in time of the releasing or generating of the respective data value D can be added. One or more of the data consuming tasks can select the search method on the circular buffer 52 in each case, in order to determine a data element D that has been generated or released at a specific time value (as search value k) or as the last prior to or after the time value k.

Various modifications to the disclosure are possible. In particular, the features of the exemplary embodiments that have been illustrated, described, claimed or disclosed in any other manner can be combined arbitrarily with one another, replaced, supplemented or eliminated by one another.

Alternatively to the example in FIG. 5, a greater than comparison S20' and an equal to comparison (k=A[p]) can be carried out in the supplementary command S100. Alternatively, a lesser than comparison S30' and an equal to comparison can be carried out in the supplementary command S100. The person skilled in the art will see that he can obtain the same logical sequence by means of an appropriate exchanging of the three operations S22', S32', S33' with such a modification of the comparisons in the first supplementary command S100. The equations given in steps S11, S22', S32', S33' for determining a determined element index in the search field for the establishment of the search position p as well as for the updating of the lower boundary LB and/or the upper boundary UB have been selected purely by way of example.

For step S11 it is assumed that for the calculation of the new search position p, the value is always rounded down, which can be advantageously achieved by a bit by bit displacement to the right of the sum of the upper boundary and the lower boundary (UB+LB) by one bit position. As a result, the search method will always result in a value that is greater than the search value k if the search value k is not the same as the data value that was examined at the last element index to be checked (cf. FIG. 3D). If, conversely, the value is always rounded up in step S11, then the method shown in FIG. 5 would always result in a value that is less than the search value k at the last element index that has been checked, if the values are not the same. This represents the preferred implementation for the search for time values in a circular buffer.

The stop condition in step S13 can alternatively be carried out as an equal to comparison (UB−LB=0?). In such a case, the operations S11', S32', S33' for updating the upper and/or lower boundaries UB, LB should be possibly modified. With rounding down in step S11, the instruction specified in operation S22' can be modified to (LB=p). Furthermore, the instruction specified in operation S32' can be modified to (UB=p−1). If a rounding up takes place in step S11, the instructions in operation S22', S32' could read: LB=p+1, UB=p.

The example shown in FIG. 3 assumes purely by way of example that the indexed data structure A has a number of elements corresponding to a power of 2 ($2^n$). Alternatively, arbitrary different element numbers may be provided. In this case, the instructions specified in operations S22', S32' are to be modified in order to calculate an element index determined in the search field as the search position in another manner.

In step S10 the lower boundary LB and the upper boundary UB can be set to arbitrary suitable start values. In particular, with the use of a circular buffer 52, the lower boundary LB can be set to the currently oldest data value contained therein, and the upper boundary UB can be set to the currently youngest data value contained therein, wherein, however, one element should always be kept free for writing.

When it has been ensured that the ordered data structure A contains at least two elements in the first retrieval of the binary search, the steps S11 and S12 can be displaced to follow step S13, in a modification of the example from FIG. 5. As a result, in the last search run, the calculation of the search position p and the retrieval of the data element at the search position A[p] is not needlessly executed twice. It can then be furthermore provided that in the third operation S33', the value of the lower boundary LB is set to the value of the upper boundary UB plus one (LB=UB+1). Alternatively, it can be provided that in the third operation S33', the value of the upper boundary UB is set to the value of the lower boundary LB minus one (UB=LB−1). In both alternatives, the second supplementary command S200 only needs to write in one target operand (lower boundary LB OR upper boundary UB) in each of the operations S22', S32', S33', which can be advantageous regarding the implementation of the supplementary command in hardware. The parallel writing into TWO target operands (lower boundary LB AND upper boundary UB) can then be eliminated. Incidentally, S22' may be an example of a first pre-defined operation, S32' may be an example of a second pre-defined operation, and S33' may be an example of a third pre-defined operation. The operations S22', S32', S33' may be an example of three pre-defined operations.

The query depicted in step S13 can be negated, such that the comparison reads: LB≥UB? In this case, the instructions (YES/NO) shown in the outputs of step S13 in FIG. 5 are to be exchanged.

According to the present disclosure, the microprocessor comprises a set of commands, a register section having a status register, and an arithmetical logical unit. A first flag for storing the logical result of a comparison operation is provided in the status register. This can be, in particular, a zero-flag.

According to the present disclosure, the status register furthermore comprises a second flag for storing the logical result of a second comparison operation.

In the following, the two flags for storing the results of a respective comparison operation shall be simply referred to as the "first flag" and the "second flag." All other flags present in the status register shall be given a delimiting term, e.g. "carry flag" etc.

The microprocessor set of commands is expanded in relation to conventional command sets by at least two supplementary commands, by means of which a binary search can be executed significantly faster while avoiding the conditional jumps.

The command set according to a preferred design comprises a first and a second supplementary command. The first supplementary command executes at least one comparison between two obtained operands. In particular, this is a "greater than" comparison between the first and the second operands, or a lesser than comparison between the first and second operands. The results of this comparison are stored in the second flag.

In the execution of a binary search, a further comparison between the same operands is also executed, which is preferably a lesser than comparison or greater than comparison that is the inverse of the aforementioned comparison. The results of this further comparison are stored in the first flag. According to a preferred design, the first supplementary command executes this further comparison. In other words, the microprocessor preferably comprises a first supplementary command, in which two different comparisons between two obtained operands are executed, in particular a greater than comparison and a lesser than comparison, wherein the results of the first comparison (e.g. the greater than comparison) are stored in the first flag, and the results of the second comparison (e.g. the lesser than comparison) are stored in the second flag.

The second supplementary command of the microprocessor is designed to update the upper and/or the lower boundaries UB, LB of a search field for the next run in a binary search. The second supplementary command preferably takes three (different) operands for this, and selects, based on a logical match, the values in the first flag and in the second flag of one of at least three predefined operations. The second supplementary command furthermore executes the selected operation, wherein calculations between the two operands are carried out, in particular, and in which a new value is defined in at least one of the operands. The three operands are, in particular:

a variable for storing the current element index for the lower boundary of a search field of the binary search;

a variable for storing the current element index for the upper boundary of the search field of the binary search; and a variable for storing the current search position.

It is beneficial for the efficiency of the execution when the updated value of the upper and/or lower boundaries of the search field for the next run are calculated based on the current search position, since a determined position inside the current search field is already stored in the search position.

According to a less efficient variation, the second supplementary command only takes two operands, specifically the (current) upper limit and the (current) lower limit of the search field, wherein the calculation of the updated value(s)

for the upper and/or lower limits (determined positions in the current search field) occurs independently of the value of the current search position.

A special feature of the second supplementary command is that this takes two target operands, wherein, depending on the results of the comparison stored in the first flag and in the second flag, it is decided whether it should be written in only the first target operand (upper boundary), only in the second target operand, or, optionally, in both operands.

The disclosure furthermore relates to a search method for executing a binary search, making direct use of the command set of the microprocessor. The element index of a search value is sought in the method in an indexed data structure having ordered elements. A coherent search field is defined in the data structure by a lower boundary in a first element index and an upper boundary in a second, higher element index. Successive steps are executed repeatedly.

The (search) position is set on a determined element index in the search field. At least two comparisons between the value in the data structure at the search position and the search value are carried out. Depending on the results of these comparisons, the lower and/or the upper boundaries of the search field are modified, such that the new search field for the next repetition comprises only a subfield of the prior search field, this being the subfield in which the search value must be located according to the results of the comparison. When the search value is the same as the value in the data structure at the current search position, both boundaries are set at the element index of the current search position, in accordance with a preferred design variation, such that the size of the search field is set to one, and a stop condition is thus triggered.

The process ends when the search value is found in the data structure, or when the search field contains only one single element, or no longer contains any elements. Depending on the design of the method, the element index in which the search value has actually been located in the data structure is then delivered. If the search value is not located in the data structure, then an error value, e.g. the value negative one, or the element index of that value in the data structure that is one higher or one lower than the search value, can be delivered.

In the search method according to the present disclosure, the first supplementary command of the microprocessor is used to execute at least one of the two comparisons between the value in the data structure at the search position and the search value, in particular as a greater than comparison and/or a lesser than comparison. The second supplementary command is used to update the lower boundary and/or the upper boundary of the search field.

It is noted that a flowchart or the process of the flowchart in the present application includes steps (also referred to as sections), each of which is represented, for instance, as S10. Further, each step can be divided into several sub-steps while several steps can be combined into a single step.

While the embodiments, the configurations, the aspects of a microprocessor with supplementary commands for binary search and an associated search method have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A search method for performing a binary search with direct utilization of an instruction set of a microprocessor for a vehicle control device, wherein in the method a position of a search value is determined within an indexed data structure with sorted elements, and wherein a search field is defined within the data structure by a lower boundary with a first element index and by an upper boundary with a second element index, and wherein following steps are performed iteratively:

placing a search position to an averaged element index within the search field;

performing at least two comparisons among the element in the data structure at the search position and the search value, depending on results of the at least two comparisons, varying the lower boundary and/or the upper boundary of the search field so that a new search field for a next iteration comprises only a partial field of a previous search field, wherein:

the method terminates, when the search value is found within the data structure or when the search field comprises only a single or no remaining element;

the microprocessor includes
the instruction set;
a register section with a status register, a first flag being provided in the status register for storing a logical result of a comparison operation; and
an arithmetic logical unit, wherein:

the status register comprises a second flag for storing the logical result of a second comparison operation;

the instruction set comprises a first additional instruction, which performs a comparison among two handed-over operands, in particular a greater-comparison or a smaller-comparison, wherein a result of the comparison is stored in the second flag; and the instruction set comprises a second additional instruction, which selects and performs one of at least three pre-defined operations on a basis of a logic connection of values in the first flag and the second flag, for updating the upper boundary and/or the lower boundary of the search field in the binary search for the next iteration;

the first additional instruction of the microprocessor is used for performing at least one of the at least two comparisons among the element in the data structure at the search position and the search value; and the second additional instruction is used for varying the lower boundary and/or the upper boundary of the search field.

2. The search method according to claim 1, further comprising:

additionally performing, by the first additional instruction, a further comparison among the two handed-over operands, in particular the smaller-comparison or the greater-comparison, which is respectively inverse to the comparison, and storing a result of the further comparison in the first flag.

3. The search method according to claim 1, further comprising:

receiving, by the second additional instruction, a first operand, a second operand and a third operand, wherein the at least three pre-defined operations comprise statements for updating the upper boundary and the lower boundary in the binary search for the next iteration.

4. The search method according to claim 1, further comprising:
performing a first pre-defined operation which by using a first operand calculates a value and stores in a second operand;
performing a second pre-defined operation which by using the first operand calculates a value and stores in a third operand; and
performing a third pre-defined operation which
either by using the first operand writes both to the second operand and the third operand, or alternatively
by using the second operand calculates a value and stores in the third operand, or alternatively
by using the third operand calculates a value and stores in the second operand.

5. The search method according to claim 1, wherein:
the arithmetic logical unit comprises a first comparison unit and a second comparison unit.

6. The search method according to claim 5, wherein:
both comparison units are operable simultaneously for performing the comparison and a further comparison, in particular by the first additional instruction.

7. A program product comprising instructions stored in a memory for implementing a search method according to claim 1, in particular wherein the program product is present in a form of assembler code or machine code.

8. A non-transitory computer-readable medium comprising instructions for execution by a microprocessor, the instructions including a compiler for translating a source code in a problem oriented programming language into a machine code or assembler code, which can be executed by the microprocessor for a vehicle control device, the microprocessor including an instruction set a register section with a status register, a first flag being provided in the status register for storing a logical result of a comparison operation; and an arithmetic logical unit, wherein: the status register comprises a second flag for storing the logical result of a second comparison operation; the instruction set comprises a first additional instruction, which performs a comparison among two handed-over operands, in particular a greater-comparison or a smaller-comparison, wherein a result of the comparison is stored in the second flag; and the instruction set comprises a second additional instruction, which selects and performs one of at least three pre-defined operations on a basis of a logic connection of values in the first flag and the second flag, for updating an upper boundary and/or a lower boundary of a search field in a binary search for a next iteration;
the compiler comprising:
at least one intrinsic function for encapsulating the first additional instruction and/or the second additional instruction of the microprocessor in a function call, which is available to the source code in the problem oriented programming language; and/or
translation statements, which utilize the first additional instruction and/or the second additional instruction of the microprocessor in generation of the assembler code or machine code, in particular for translating a section of a problem oriented programming language source code, which provides execution of the binary search, wherein the binary search directly utilizes the instruction set of the microprocessor for the vehicle control device, wherein a position of a search value is determined within an indexed data structure with sorted elements, and wherein a search field is defined within the data structure by the lower boundary with a first element index and by the upper boundary with a second element index, and wherein in the binary search following steps are performed iteratively:
placing a search position to an averaged element index within the search field;
performing at least two comparisons among the element in the data structure at the search position and the search value,
depending on results of the at least two comparisons, varying the lower boundary and/or the upper boundary of the search field so that a new search field for a next iteration comprises only a partial field of a previous search field,
wherein:
the binary search terminates, when the search value is found within the data structure or when the search field comprises only a single or no remaining element;
the first additional instruction of the microprocessor is used for performing at least one of the at least two comparisons among the element in the data structure at the search position and the search value; and
the second additional instruction is used for varying the lower boundary and/or the upper boundary of the search field.

9. A vehicle control device comprising a microprocessor for a vehicle control device, the microprocessor comprising:
an instruction set
a register section with a status register, a first flag being provided in the status register for storing a logical result of a comparison operation; and
an arithmetic logical unit,
wherein:
the status register comprises a second flag for storing the logical result of a second comparison operation;
the instruction set comprises a first additional instruction, which performs a comparison among two handed-over operands, in particular a greater-comparison or a smaller-comparison, wherein a result of the comparison is stored in the second flag; and
the instruction set comprises a second additional instruction, which selects and performs one of at least three pre-defined operations on a basis of a logic connection of values in the first flag and the second flag, for updating an upper boundary and/or a lower boundary of a search field in a binary search for a next iteration;
the microprocessor is configured to perform the binary search with direct utilization of the instruction set of the microprocessor, wherein in the binary search a position of a search value is determined within an indexed data structure with sorted elements, and wherein the search field is defined within the data structure by the lower boundary with a first element index and by the upper boundary with a second element index, and wherein in the binary search the microprocessor is configured to perform iteratively:
place a search position to an averaged element index within the search field;
perform at least two comparisons among the element in the data structure at the search position and the search value, depending on results of the at least two comparisons, vary the lower boundary and/or the upper boundary of the search field so that a new search field for the next iteration comprises only a partial field of a previous search field, wherein:

the binary search terminates, when the search value is found within the data structure or when the search field comprises only a single or no remaining element the first additional instruction of the microprocessor is used for performing at least one of the at least two comparisons among the element in the data structure at the search position and the search value; and the second additional instruction is used for varying the lower boundary and/or the upper boundary of the search field.

10. The vehicle control device according to claim 9, further comprising:

a data storage, in which at least one indexable ring buffer is provided, wherein:

tuples of at least one data element and a time value can be stored repetitively in the ring buffer; and the binary search is performed to determine an element index in the ring buffer, where a time value is located, which is equal to a reference time value or a closest time value to the reference time value.

* * * * *